US012736337B2

(12) United States Patent
Aebischer et al.

(10) Patent No.: US 12,736,337 B2
(45) Date of Patent: Sep. 15, 2026

(54) CALIBRATION OF A COORDINATE-MEASURING DEVICE

(71) Applicant: TESA SÀRL, Renens (CH)

(72) Inventors: Beat Aebischer, Heerbrugg (CH); Shiyao Bergamaschini, Puidoux (CH); Christian De Graffenried, Attalens (CH); Julien Chardonnens, Bulle (CH); Davide Manetti, Pully (CH); Sepide Azhdari, Ecublens (CH)

(73) Assignee: TESA SÀRL, Renens (CH)

( * ) Notice: Subject to any disclaimer, the term of this patent is extended or adjusted under 35 U.S.C. 154(b) by 394 days.

(21) Appl. No.: 18/368,942

(22) Filed: Sep. 15, 2023

(65) Prior Publication Data

US 2024/0093987 A1 Mar. 21, 2024

(30) Foreign Application Priority Data

Sep. 20, 2022 (EP) .................................... 22196704

(51) Int. Cl.
*G01B 21/04* (2006.01)

(52) U.S. Cl.
CPC ......... *G01B 21/042* (2013.01); *G01B 21/045* (2013.01)

(58) Field of Classification Search
CPC ............................ G01B 21/042; G01B 21/045
See application file for complete search history.

(56) References Cited

U.S. PATENT DOCUMENTS 4,888,877 A 12/1989 Enderle et al.
5,526,576 A 6/1996 Fuchs et al.
6,134,506 A 10/2000 Rosenberg et al.
2003/0233760 A1 12/2003 Lotze
2006/0266100 A1 11/2006 McMurtry et al.
2009/0082986 A1* 3/2009 Pettersson ............ G01B 21/042 702/95
2010/0206040 A1* 8/2010 Ebara .................. G01B 21/042 73/1.79
2013/0090878 A1* 4/2013 Somerville .......... G01B 21/042 702/95
2018/0112971 A1* 4/2018 Jensen .................. G01D 5/268
2020/0049498 A1* 2/2020 Rees ...................... G01B 5/008

FOREIGN PATENT DOCUMENTS

CN 103630096 A * 3/2014
DE 10157174 A1 * 6/2003 ........... G01B 21/042
EP 0 759 534 A2 2/1997
EP 1 405 036 A1 4/2004
WO 03/002938 A1 1/2003

* cited by examiner

*Primary Examiner* — John C Kuan
(74) *Attorney, Agent, or Firm* — Maschoff Brennan

(57) ABSTRACT

A method of calibrating a coordinate measuring machine in which the immutable parameters of the articulated probe head are determine and stored at factory, while the connection parameters and other parameters dependent on the configuration of the system are determined in-situ, with a calibration artifact. The process builds a mathematical model that is the composition of an immutable factory-determined model with the in-situ model. The immutable model can be stored in a non-volatile memory physically provided in the articulated head. The method can fall back to a correction look up table for certain selected orientations of the probe where improved accuracy is needed.

17 Claims, 2 Drawing Sheets

30
31
32
33
35
38
50
61
62
80
Z
Y
X 51
53
55
57
58
61
62
70
38
$\Sigma_R$
$P_R$
$r_{RB}$
$P_B$
$r_{BA}$
$\alpha_B$
B
$\Sigma_B$
$\alpha_A$
$\Sigma_A$
A
$P_A$
$r_{AT}$
$P_T$

CALIBRATION OF A COORDINATE-MEASURING DEVICE

REFERENCE DATA

The present application claims priority of European Patent application EP22196704 of 20 Sep. 2022 in the name of the present applicant, the contents whereof are hereby incorporated in their entirety.

Technical Domain

The present invention concerns a method for calibrating a coordinate-measuring device, and coordinate-measuring systems that include articulated head and can assume a plurality of configurations.

RELATED ART

Coordinate-measuring systems are used in several industrial processes to determine the geometry (notably the shape and dimension) of manufactured workpieces by sensing discrete points on the surface of said workpieces. These systems use a precise positioning platform to bring a coordinate probe in contact with a workpiece, or close to it, for sensing points on the surface. Probes that need to touch the workpiece are usually called contact coordinate probes, while those that need to come close to the workpiece without touching it are commonly called non-contact probes, and frequently use optical detection.

Coordinate-measuring systems can take the form of coordinate-measuring systems, robots or machines (CMMs) as well as of measuring solutions or apparatus for equipping production machines such as machine-tools or additive printers, or inspection systems. In particular, the coordinate-measuring systems can be configured or designed to move the precise positioning platform along one, two, three or more translation axes, preferably orthogonal to each other. In some configurations, the coordinate-measuring systems can additionally comprise a rotary table for the workpiece, which constitutes another degree of freedom.

Touch probes are very popular in these applications. They have a very precise sphere at the tip of a stylus and generate an electric signal when the sphere touches the surface of the workpiece. A controller, for example in form of a controlling processor or digital circuit, stores the position of the positioning platform (and the position of a rotary table, if present) whenever there is a contact, and computes from these data the coordinates of the contact point, or of a continuity of points along a contact trajectory, if the coordinate machine is so driven.

Some touch probes are designed for supporting continuous measurements of profiles of workpiece (also called as scanning). In this configuration, the controller can deduce geometrically the coordinates along a path on the surface of the workpiece by continuously recording the position (e.g., coordinates) of the positioning platform as well as contact data provided by the touch probe during the scan of the workpiece.

It is also known to use non-contact probes as coordinate probes in coordinate-measuring systems. These probes include optical distance sensors that send a light ray toward the surface of the workpiece, collect the backscattered light and determine the distance to the workpiece in various ways, for example, but not only, by light interferometry, by triangulation, or by time-of-flight. In contrast with touch probes, optical probes are often directional. As for the case of the touch probes, the controller can deduce geometrically the coordinates of the illuminated point on the workpiece using the position (e.g., coordinates) of the positioning platform as well as the distance and orientation data provided by the non-contact probe.

To obtain the desired coordinates, the controller transforms the instantaneous or recorded data provided by the system, that comprises notably the coordinates of the positioning platform and the position and/or orientation of the coordinate probe as well as the kinematics and structures data thereof (for example the dimensions of the touch sphere of a touch probe or the position and orientation of the optical axis of an optical probe), into a coordinate within the operating volume of the system. To provide both the required accuracy and precision of precise systems (e.g., operating in the 1 μm range), mounting inaccuracies as well as thermal dilations must be considered into the transformation. Thus, this transformation is adjusted by a calibration process, in which the coordinate-measuring system and the probe are applied to an artifact whose shape is known a priori, for example a precise sphere. Calibrations are carried out every time when the coordinate system is modified, for example when a coordinate probe is changed with another, at regular intervals, or when needed.

Many coordinate-measuring systems can reorient the coordinate probe, be it a touch probe or a contactless probe, by interposing between the positioning platform and the probe itself an articulating probe head. This device can rotate the probe by configuring the angle of one, two, three or more than three rotatable elements. Generally, the articulating probe head has two or three rotational axes, eventually one orthogonal to another, to cover all the possible orientations required in most applications. Many probe heads have two rotors placed one after the other in a series configuration with orthogonal rotation axes, and the present document will refer mostly to this configuration for conciseness, but this is not an essential feature of the invention. The rotation axes of the probe head can be continuous, in which case the rotation angle is read by a precision encoder, or indexed, allowing only a discrete set of angles, for example 72 position on a circle separated by 5° from one another. In the indexed heads, the repeatability of the angles is ensured by a precisely machined coupling, and the position can be read by a potentiometer or by a simple encoder.

Articulated probe heads are a necessity in the measure of complex workpieces because different orientations are needed to approach all the points of interest. Yet, they increase the difficulty of calibration of the coordinate measuring system. In general, a different calibration for each possible configuration of the probe head is required. Even using interpolation, the calibration of a two-axis system can be excessively long and may reduce considerably the availability of the machine.

It is known, for example from EP0759534, to calibrate a coordinate measuring machine by determining an error map, or table, that stores measuring errors for a large set of possible configurations (orientations and/or position) of the probe. For at least some configurations, the errors can be determined with individual configuration (or index) calibrations (i.e., thereafter also referred as “individual calibration” or “model-independent calibration”), while for the remaining configurations, the errors can be mathematically inferred (e.g., interpolated) from these individual calibrations). It is also known to calibrate coordinate measuring machines by building a mathematical model of the apparatus with adaptable parameters that are determined by a fit of the calibration data, as disclosed in U.S. Pat. No. 4,888,877.

Calibrating with an error table, each error of the table being separately determined by an individual calibration, is believed to be the most precise approach, but it requires not only storing a great amount of data but also time-consuming computations. Mathematical models attempt to capture the complexity of the kinematic system in a reduced number of equations and model parameters, but they may sacrifice some accuracy in doing so.

U.S. Pat. No. 6,134,506 describes a calibration procedure for a 3D measuring apparatus relying on adjusting previous calibration parameters that have been stored in a memory.

U.S. Pat. No. 5,526,576 describes a coordinate-measurement machine loading one of data files associated with a plurality of selected probe configurations based on a measuring accuracy to be obtained.

EP0759534 describes a method for calibrating an articulated probe head on a moveable arm of a co-ordinate measuring machine. The method involves errors determination at a reduced number of discrete orientations of the articulated probe head, wherein errors at intermediate orientations are linearly inferred.

EP1405036B1 describes a calibration method for a coordinate measuring device having a rotating/pivoting joint, wherein uniquely positions and angular positions of the probe required for a given measurement are identified and then calibrated.

Demanding users of coordinate measuring machines require accurate measurements (in the μm range), work with different measuring configurations (notably probes and extensions thereof), and use measurement plans with many distinct orientations and positioning of the probe around the workpiece. These users need to calibrate their apparatuses for all the possible combinations of orientation and tool and must repeat the calibration often enough to compensate for the unavoidable thermal drifts and tool tolerances. In these circumstances, the unproductive time spent in calibration can grow considerably.

Short Disclosure of the Invention

An aim of the present invention is the provision of a method of calibrating a coordinate measuring machine that overcomes the shortcomings and limitations of the state of the art.

According to the invention, these aims are attained by the object of the attached claims, and especially by a method of calibration for a coordinate-measuring system with an articulated probe head between a positioning platform and a coordinate probe, the method including a first calibration in which is collected (notably determined) a first set of model parameters that defines a model of the articulated probe head. The first calibration involves measuring geometry data pertaining to the articulated probe head while the probe head is caused to assume (e.g., represent) all the configurations in a first set of configurations. Preferably, such first set of model parameters are stored at the end of the first calibration. In a second calibration, which is usually separate and distinct from the first one, the articulated probe head is mounted on a coordinate measuring system, connected to a coordinate probe, and the assembly is used to measure a calibration artifact whose geometry is known while the probe head is caused to assume all the configurations in a second set of configurations, followed by a determination of additional model parameters that define a model of the assembly of the probe head with the coordinate probe together with the first set model parameters. The model will then be used by the coordinate-measuring system with the coordinate probe mounted on the articulated head for measuring coordinates of points on a surface of a workpiece.

The first calibration may be called also the "factory calibration", or "immutable calibration", since it will be often part of the manufacturing of the probe head and it is agnostic with respect to the coordinate probe, but this does not imply that the first calibration cannot be repeated on-site or modified if the circumstances require it. The second calibration may be also called "additional calibration step" or "later calibration step". The articulated probe head may be simply denoted as "probe head" in the following, and the coordinate probe that is connected to the probe head may also be denoted simply as "probe".

Dependent claims deal with important and useful features that can be incorporated in the inventive method but are not essential, including carrying out the first calibration step by mounting the articulated probe head in a calibration coordinate-measuring system (notably a calibration coordinate measuring machine-CMM-) and measuring a calibration body with a calibration coordinate probe or, in alternative, by mounting the articulated probe head in a measuring volume of a measuring apparatus such as a laser scanner, a tracer, or an interferometer.

Other claimed optional aspects include: the number of configurations in the second set being less than the number of configurations in the first set, the number of rotational degrees of freedom in the articulated head, that can be one, two, three, or more than tree, the storage of the first set of model parameters in a non-volatile memory that is physically comprised in the articulated head, and one or more changes of the coordinate probe before a later calibration step.

As the first calibration and the second calibration are distinct, the former can be conveniently done at the factory (i.e. the fabrication site of the articulated probe head), or at the initial installation of a measuring system (i.e. the installation or assembly site of the measuring system), and is considerably more extensive and time-consuming than the latter. The first calibration may involve more than 200 orientations of the articulated probe head, for example 600 to 1'000 distinct orientations and can last from two to four hours when it is carried out with a calibration artifact (e.g. a calibration sphere). The second calibration may involve much less positions of the probe head, typically only six or twelve, and is much quicker. The first set of configurations may be fifty times larger than the second one, or more. It is to notice that, in some particular case or context, the first calibration can be done (or repeated) in-situ, e.g. by an agreed technician and/or by the customer.

The method may include a selective accurate calibration of a third set of configurations of the articulated probe head. This step may include building and recording a table of correspondence between a position of the positioning platform and a position of a reference point of the coordinate probe for such third set of configurations.

In one embodiment, the accurate calibration can be part of the second calibration step, i.e. the step is executed when the articulated probe head is mounted on the coordinate measuring system and connected to a coordinate probe. This step can be executed sequentially (i.e. before or after) or simultaneously to the step of measuring the artefact for determining the additional model parameters. In case of a sequential step, the individual calibration can rely on the same or on a different calibration artifact than the one used for determining the additional model parameters.

Advantageously, during the measurement phase, when the probe head is in the third set of configurations, the model of the assembly can be overridden by or corrected with calibration data provided by the selective accurate calibration, e.g. with the information in the table. In this manner, the coordinate measuring system uses the data in the table for a restricted set of orientation of the probe, and the model for generic orientations. This approach can provide an improved precision for the restricted set of orientations.

The third set of configurations can be chosen based on a model of the workpiece that preferably comprises tolerances and relationship (e.g. Geometric Dimensioning and Tolerancing-GD&T-model), to select the orientations used for the most critical measurements. Alternatively, or complementarily, orientations can be selected according to (e.g. function of) the mount of the articulated probe head on the coordinate-measuring system (e.g. orientation of the articulated probe head mount) and/or regularly spaced along the rotational axes.

Another aspect of the invention concerns an articulated probe head connectable to a positioning platform of a coordinate-measuring system by one proximal connector, and to a coordinate probe by a distal connector, comprising a non-volatile memory unit programmed to store a first set of model parameters defining a model of the articulated probe head. Preferably the probe head is removably connectable to a positioning platform of a coordinate-measuring system, e.g. by means of a dedicated interface providing rapidly and eventually even automatic head exchanging. An example is the SENMATION universal sensor interface provided by Hexagon Metrology. Preferably, the non-volatile memory unit has a capacity for at least two thousand numeric and/or logic values.

A further aspect of the invention concerns a coordinate-measuring system (notably a coordinate measuring machine) enabling the above-described method. In particular, the invention also concerns a coordinate-measuring system including: a positioning platform, an articulated probe head connected to the positioning platform, and a coordinate probe removably connected to the articulated probe head, whereby the articulated probe head can assume a plurality of configurations corresponding to diverse orientations of the coordinate probe, and wherein the coordinate-measuring system is configured to:

- collect (notably retrieve) a first set of model parameters defining a model of the articulated probe head based on a first calibration wherein the probe head is caused to assume all the configurations in a first set of configurations;
- to measure an artifact whose geometry is known while the probe head is caused to assume all the configurations in a second set of configurations;
- based on the measure of the artifact, to determine additional model parameters defining, with the first set of model parameters, a model of the assembly of the articulated probe head on the coordinate-measuring system with the coordinate probe; and
- to measure a workpiece by:
  - bringing the coordinate probe in contact with or in proximity to the workpiece, wherein the articulated probe head is in a configuration being selected by the coordinate-measuring system; and
  - using the model of the assembly, determining coordinates of points on the workpiece's surface from a measure of the position of the positioning platform. The determination of the coordinate can additionally use an outcome (e.g. signal or data representing: a distance, an orientation, and/or a contact with a surface of the workpiece) provided by the coordinate probe.

The invention also concerns the coordinate-measuring system, notably in form of a coordinate measuring machine that is configured to enable above-embodiments of the above-described method, as illustrated in FIG. 1.

Notably, the invention also concerns the coordinate-measuring system including: the positioning platform, the articulated probe head connected to the positioning platform, and the coordinate probe removably connected to the articulated probe head, whereby the articulated probe head can assume a plurality of configurations corresponding to diverse orientations of the coordinate probe, and wherein the coordinate-measuring system can be configured to:

- Collect (notably retrieve) the first set of model parameters defining a model of the articulated probe head based on the first calibration wherein the probe head is caused to assume all the configurations in the first set of configurations; the model parameters can be recorded in a memory of the articulated probe head, of the coordinate-measuring system (e.g. the controller), or in an external memory being accessible by the coordinate-measuring machine (e.g. another coordinate-measuring machine, a networked server, a cloud server or cloud storage)
- to measure an artifact whose geometry is known while the probe head is caused to assume all the configurations in the second set of configurations;
- based on the measure of the artifact, to determine additional model parameters defining, with the first set of model parameters, the model of the assembly of the articulated probe head on the coordinate-measuring system with the coordinate probe; and
- to measure the workpiece by selecting a desired configuration of the articulated probe head, bringing the coordinate probe in contact with or in proximity to the workpiece and determining coordinates of points on the workpiece's surface from a measure of the position of the positioning platform using the model of the assembly.

In an advantageously embodiment, the coordinate-measuring system is further configured to individual calibrating a third set of configurations of the articulated probe head, wherein the determination of coordinates of point on the workpiece's surface includes overriding or correcting the model of the assembly when the configuration of the articulated probe head is in the third set of configurations.

With respect to what is known in the art, the invention provides the advantage that the calibrations of the system do not need to explore the whole space of possible configurations of the articulated head, but only as much as necessary to capture the motion of the assembly composed by the articulated head and the coordinate probe in a mathematical model. Moreover, since the model of the articulated head has already been captured in the first calibration, few additional model parameters are sufficient, and the in-situ calibration are considerably faster.

The model parameters determined in the second calibration describe, mostly, how the probe head mounted in the CMM, how the coordinate probe is attached to the probe head, what probe is used (e.g. the length of the stylus and so on), while the first set of model parameters describes the degrees of freedom of the articulated probe head, such as the relative position of the two axes, their defect of orthogonality, their intrinsic errors and so on. This model can be considerably complex and require many model parameters, possibly hundreds or thousands of model parameters.

No matter how sophisticated the models are, a model-independent calibration with a look-up table may lead to superior accuracy, in some cases. The invention has a variant that stores such a look up table for a selected subset of important orientation of the probe. The important orientations can be selected a priori analysing the measurement plan on a model of the workpiece. When the probe is in one of these important orientations, the look-up table is used to override or correct the model. This hybrid approach combines a short calibration time, outstanding accuracy for the important orientations, and an overall low error for all the possible configurations of the measuring system.

SHORT DESCRIPTION OF THE DRAWINGS

Exemplar embodiments of the invention are disclosed in the description and illustrated by the drawings in which.

EXAMPLES OF EMBODIMENTS OF THE PRESENT INVENTION

Figures 1, 2:
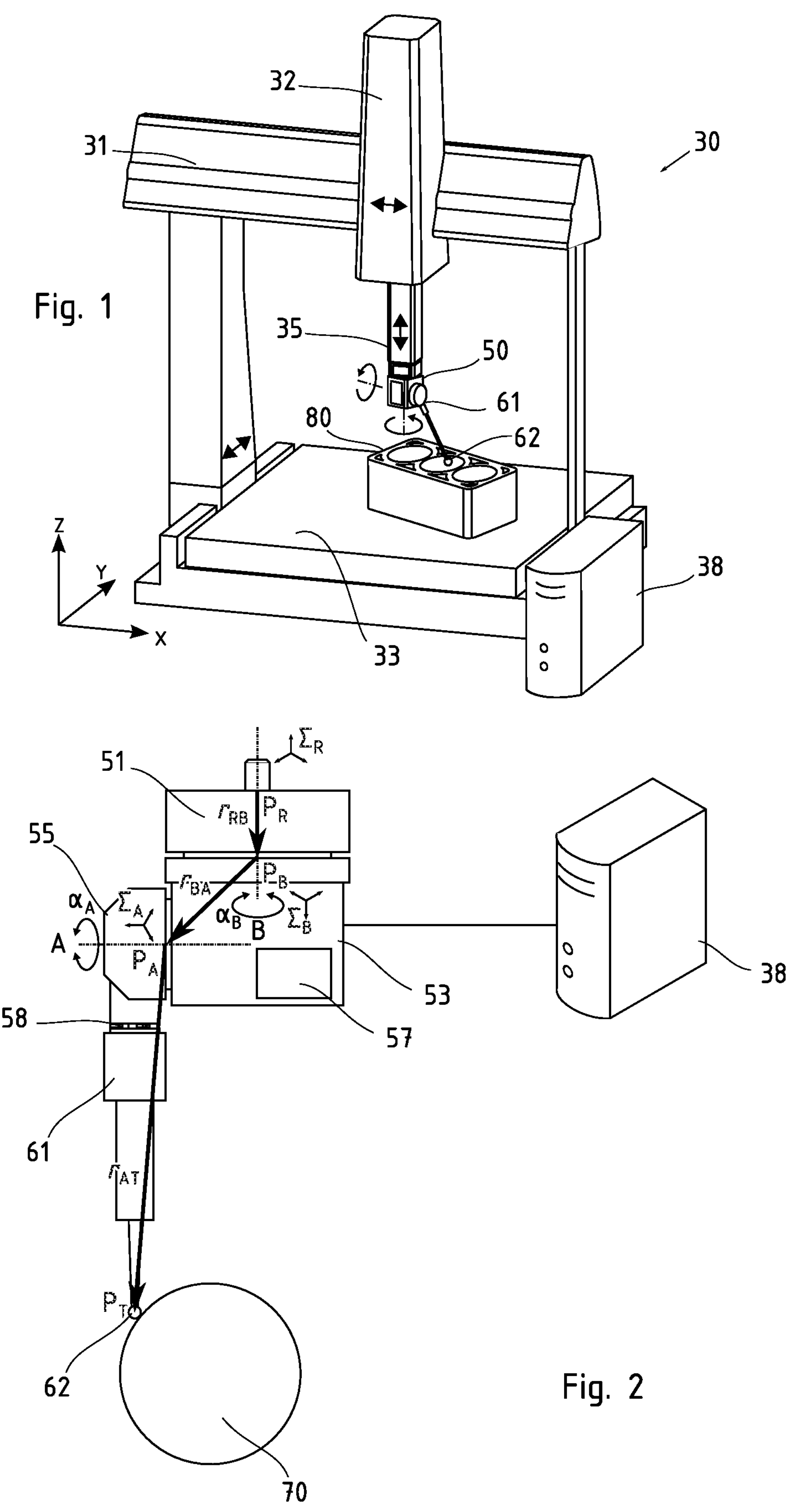
FIG. 1 illustrates schematically a coordinate measuring machine (CMM), which an articulated head and a coordinate probe.
FIG. 2 is a conceptual representation of a model of the articulated head with the coordinate probe.

FIG. 1 shows a coordinate-measuring system in form of a coordinate measuring machine 30 of a common kind. The main structure of the machine has a horizontal table 33 on which rest the workpiece 80 that is measured. The bridge 31 moves along one first linear axis on the table 33, and the carriage 32 moves along a second linear axis orthogonal to the first one. The vertical spindle 35 (also called quill or Z-ram, according to different usages) moves on a third orthogonal axis, such that the end extremity of the spindle 35 is a positioning platform that can be positioned at any desired point in the measuring volume of the machine (i.e., in the volume where the CMM is able to provide a measure of a surface of an object). The CMM 30 has also motors that cause the motion of bridge 31, carriage 32 and spindle 35, as well as encoders that read the corresponding positions along the measuring axes X, Y, Z. A computer 38 is programmed to command the motors according to a predefined measuring plan that is designed in consideration of the shape of the workpiece 80.

FIG. 1 shows a touch probe 61 that has a spherical tip 62 designed to touch the workpiece 80 at the desired points. The touch probe 61 is often a trigger probe, configured to generate an electric signal on contact. This signal is used by the controller 38 to store the instantaneous values of X, Y and Z, and compute the corresponding coordinates of the contact point, by known methods.

The trigger probe 61 could be replaced by another kind of coordinate probe, for example an optical non contacting probe, a scanning probe, a 'hard' probe and so on, without leaving the scope of the invention. The shape and length of the stylus is not limited, either.

While the bridge structure of FIG. 1 is common, it is not the only one possible, and the invention is not limited to this execution but includes all the variety of shapes and structures found in coordinate measuring systems. The invention explicitly comprises systems in which the carriage slides along a horizontal beam that is cantilevered, rather supported at both ends, and articulated arm machines exclusively based on rotational degrees of freedom instead of linear ones. The size of the machine can also vary, from benchtop machines to large devices used to measure vehicles, aircrafts or turbines, without departing from the scope of the invention. The articulated probe head can be mounted vertically or horizontally on the positioning platform of the system. The invention explicitly comprises systems comprising moveable tables, e.g., rotary table, for movably supporting the workpiece during operations (e.g. measurements). Precision and accuracy in CMM range from sub-micron accuracy in laboratory equipment to maybe 10-100 μm in some industrial application. The invention is intended to include all these variants.

The articulated probe head 50 is interposed between the Z-ram 35 of the coordinate measuring machine and the coordinate probe 61. It has preferably two or three rotational degrees of freedom that allow to reorient the coordinate probe in a plurality of configurations, according to the geometry of the workpiece under measurement. The example presented has two rotational orthogonal axes, and its structure is better visible in FIG. 2. Alternatively, the articulated probe head 50 can have one or more than three rotational degrees of freedom.

The articulated probe head of FIG. 2 has a support element 51 at a proximal end, with a connector that is compatible with the end of the Z-ram 35, for attaching thereto. In many cases, the connection between the articulating head and the Z-ram is assured by a simple threaded stud, but other means are possible. Once in place, the support element 51 is immovably affixed to the Z-ram 35 and their relative position and orientation does not change. Even the illustrated support element 51 is configured to allow the articulated probe head to be manually connectable and releasable from the Z-ram 35, the support element can be configured and/or designed to provide automatic head exchanging on the coordinate measuring machine.

The articulated head 50 has a distal extremity 58 with a connector configured to mate with a compatible connector of the coordinate probe. This connector is used to rapidly exchange probes and extensions according to the need. A threaded link can be used here, but quick-release systems capable of being operated automatically and providing a repeatable positioning are preferred. An example is the TKJ connector provided by Hexagon Metrology, but other systems are available.

In the represented embodiment, the articulated head 50 has a first rotor 53 rotatably connected to the support element 51, and a second rotor 55 rotatably connected to the first rotor 53. The first rotor can turn about a vertical axis conventionally denoted as 'B' axis, and the second rotor can turn about a horizontal axis conventionally denoted as 'A' axis. The combined effect of these degrees of freedom is that the coordinate probe 61 can be set in a plurality of orientation in space.

Each configuration of the probe head 50 can thus be described by the values of the angles $\alpha_B$ and $\alpha_A$ of the first and second rotor about the respective rotation axis. Preferably, the articulated probe 50 is motorized: it comprises one or more actuators to set the angle of rotation of the first and second rotor at will. These actuators are operated automatically by the controller 38 according to a measurement plan, and the probe head has encoders that transmit the instantaneous values of $\alpha_B$ and $\alpha_A$ to the controller.

In this context, a model of the articulated probe head is a mathematical correspondence between the configuration parameters $\alpha_B$ and $\alpha_A$ and the position and orientation of the active end of the probe. In indexed heads, the domain of the configuration parameters is discrete. In scanning ones, continuous.

The active end of the probe can correspond to a (physical or virtual) operational point of the (connected) coordinate probe. The point can correspond, for example, to: a contact point, a reference point or a centre of the stylus's sphere of a contact coordinate probe, or to an emission/sensing opening of a contactless coordinate probe. Alternatively, in case the coordinate-measuring system has already an accurate model of the connected coordinate probe at disposal, the active end of the probe can correspond to a reference point at a proximal end or portion (e.g. the connector) of the coordinate probe.

Geometrically, the articulated probe head with the coordinate probe of FIG. 2 can be modelled as a sum of three vectors:

- $r_{RB}$, the vector from the reference point $P_R$ at the proximal end of the probe head to the reference point $P_B$ on the first rotor,
- $r_{BA}$, from $P_B$ to the reference point $P_A$ on the second rotor,
- $r_{AT}$, from $P_A$ to the reference point $P_T$ on the active end of the coordinate probe, in this case, the centre of the touch sphere 62.

Different probes may require different models. For example, an articulated probe head with an additional rotary axis (a 'C' axis) could be modelled by a sum of four vectors.

As illustrated in FIG. 2, the model parameters may be represented as a vector comprising the vector $r_{BA}$ from $P_B$ to $P_A$ in the reference frame $\Sigma_B$ fixed to the first rotor 53, the vector $r_{AT}$ from $P_A$ to $P_T$ in the reference frame $\Sigma_A$ fixed to the second rotor 55. The model parameters may also comprise corrections related to the articulated probe head, such as: corrections to the nominal indexed angles $\alpha_A$, $\alpha_B$, wobble corrections, tilt corrections, translational wobble corrections, and the angular errors in the articulated probe head mounting. The model may also comprise corrections related to the mounted coordinate probe, such as translational corrections, notably along the three orthogonal reference axes of the reference frame $\Sigma_A$ (3DoF corrections), and, in case of contactless probe also angular deflection of the measuring axis, notably around the three orthogonal reference axes of the reference frame $\Sigma_A$ (6 DoF corrections). the model parameters may also comprise bending matrix representing bending of (e.g. structures and portions of) the coordinate probe and/or of the articulated probe head.

The model presented above can be regarded as an example of a mathematical model precisely describing an articulated probe head with two degrees of freedom, but it may be changed or refined in embodiments of the invention. The model can contain more model parameters than what is described and may be extended to account for additional degrees of freedom. Dynamic (i.e. force-dependent) effects could also be introduced (e.g. dynamic bending matrix). The method is not limited to articulated heads for coordinate probes but could be applied also to different subsystems in a measuring chain of a CMM. This disclosure describes an articulated probe head exclusively, for concision, but this is not a limitation of the invention. As visible in FIG. 2, the model of the articulated probe head comprises configuration-independent model parameter, i.e. parameters that are immutable with respect to the mounting on the CMM as well as with respect to the connected probe, e.g. the parameters describing the vectors $r_{RB}$ and $r_{BA}$ and some parameters describing the orientations of vector $r_{AT}$ based on the values of the angles $\alpha_B$ and $\alpha_A$ of the first and second rotor. These parameters can comprise—for example—corrections to the nominal indexed angles, wobble corrections, tilt corrections, translational wobble corrections of the articulated probe head mounting.

On the other part, the model of the articulated probe head also comprises configuration-dependent model parameter, i.e. parameters that are sensitive to the CMM configuration. Some of these parameters are sensitive to the mount of the articulated probe head to the CMM ("mounting parameters"), e.g. the parameters describing the relative positioning of the reference point $P_R$ with respect to a reference point of the CMM, such as—for example—angular and translational errors in the articulated probe head mounting. Each time the probe head is mounted on a CMM, these parameters have to be redetermined. Other parameters can depend on the connected probe, e.g. the parameters correcting the orientation and describing the length of vector $r_{AT}$. Of FIG. 2, such as—for example—the 3DoF or 6DoF errors of the coordinate probe and the bending matrix. These probe-sensitive parameters can thus be divided into probe mounting parameters (parameters sensitive to the mount of the probe to the probe head) and probe model parameters (parameters describing the geometry of the probe)

The separation between configuration-independent ('immutable') model parameter and configuration-dependent model parameters allows transferring part of the calibration to a different configuration. In particular, the configuration-independent parameters can be determined once for all, or infrequently, for the probe head, or for any other subsystem, and stored. This may be done at the factory, or at the initial installation of the system, or when needed.

The proposed calibration method foresees a first calibration with the following operations:

Factory-I: Collecting Orientation and Position Data

The probe head (or another accessory) is dimensionally characterised in a plurality of configurations.

Ideally, the configurations explore cover densely all the available space of configuration parameters. If the probe head indexed, all the possible value $\alpha_B$ and $\alpha_A$ may be explored. In a scanning probe head (a probe head providing continuous rotations during measurements), the parameters $\alpha_B$ and $\alpha_A$ may assume all the value in a regular grid that is judged sufficiently dense to characterize the probe head fully. In a typical case, this first set of configurations may hold at least 200, typically more than 500 configurations, e.g. 600, 1000 or more distinct orientations of the probe head.

Alternatively, the configurations used for this first calibration can be a subset of all possible combinations of the entire space formed by all the combinations of $\alpha_B$ and $\alpha_A$. Advantageously, the first set of configurations can comprise configurations relying on:

- a combination of all the possible value $\alpha_B$ and a given subset of $\alpha_A$; and/or
- a combination of all the possible value $\alpha_A$ and a given subset of $\alpha_B$; wherein the subsets can comprise less than 10 orientations, for example 3 or 4 orientations. The orientations of the subset can be regularly spaced around the rotation axis, be selected as function of the type of the articulated probe head and/or of the type of mount on the coordinate-measuring system. Notably in case of an indexed probe head, this first set of configurations may hold, for example, at least 200 orientations (e.g. for a 2-axis 7.5*indexed articulated probe head), 400-800 orientations (e.g. for a 2-axis 5° indexed articulated probe head), up to 1000 or more distinct orientations (e.g. for a 2-axis 2.5*indexed articulated probe head).

The dimensional characterization of the articulated probe head may be carried out in a special calibration coordinate measuring machine. The probe head is mounted on the machine, equipped with a calibration coordinate probe, and used to measure a calibration artifact, for example a calibration sphere. This part of the calibration can be quite long, up to a few hours, but, since it is done primarily at the factory and, infrequently, in situ, the length matters little. The calibration coordinate probe can be a touch probe, a non-contact probe, or even an hybrid probe combining touch and non-contact probing.

In a variant, the dimensional characterization of the articulated probe head may be carried out, for each configuration, by a means of a measuring apparatus, notably by acquiring orientation and positions of given surfaces of the articulated probe head located in a measuring volume of the measuring apparatus. The measuring apparatus can be configured to provide touch or contactless measurements of the articulated probe head, such as a 3D scanner, a laser scanner, a tracer, or an interferometer. This variant of the inventive method is faster and can be combined with the previous one.

Factory-II: Obtaining the Model

The data so obtained can be used to determine the model parameters of a model describing the kinematics of the probe head, through a fit process. The models used can be very detailed to capture the complexity of the probe head and may include some thousands of numeric and logic model parameters (all the components of vectorial model parameters are counted individually). Each probe head is calibrated individually and has a unique model. This step is not generally very arduous numerically. This model is called also the 'immutable' model, and its model parameters the 'immutable parameters' of the probe head, because it needs seldom to be changed, if at all.

Factory-III: Storing the Model

The immutable parameters are stored in a suitable memory and will need to be retrieved from this memory every time a CMM using the individual probe head needs to be calibrated and used. It is convenient to store the immutable parameters in a non-volatile memory that resides in the probe head itself (symbolized by block 57 in FIG. 2). This is not the only possibility, however. The immutable parameters may be stored in an external memory, for example a removable memory (a USB key) provided with the probe head, or they may be stored in a networked server, such as a cloud server, or else in a controller of another CMM being accessible through the internet. As the articulated probe head is primarily provided as part of a new CMM, the immutable parameters can be stored in a memory of the CMM (e.g. in a memory of the CMM controller 38).

When the immutable parameters are stored in a memory residing in the probe head, it is not required that they are stored in a format that is directly utilizable. The immutable parameters can be stored any format that permits their retrieval in a reliable and deterministic way, possibly requiring external resources available through a network. The immutable parameters could be compressed to save space or even replaced by a resource identifier that identifies a memory resource in a networked data storage.

After the factory calibration, the complete calibration of the measuring system is obtained by determining additional model parameters that describe the interaction of the various parts in the system. This is called in-situ calibration and is repeated when the configuration of the system is altered (for example when a different coordinate probe is mounted) or whenever necessary, among others, in case of chocks, collisions with workpieces, and significant changes in temperature. The in-situ calibration may foresee the following operations:

In-Situ-I: Configuring the Measuring System

In this phase, the system needed for a specific measurement of a workpiece is designed and assembled. In many cases, the system will comprise, on a bridge-type CMM, an orientable probe head followed by a coordinate probe, either a touch probe or a contactless one, for scanning or/and point-to-point measurements, but other cases are possible (e.g. camera and imaging probes). Complex measurements and pieces may require the use of more than one probe, for example.

In-Situ-II: Measurement Plan

A measurement plan can be regarded as a series of configurations and trajectories of the coordinate systems that yield the desired measures of the workpiece. The measurement plan determines the position and the orientation of the active end of the probe all along the measurement, takes care to avoid collisions, chooses appropriately the speed to optimise the measuring time while limiting unwanted dynamic effects, provides for tool changes, if needed, and other.

IN-Situ-III: Retrieving the Immutable Model

The immutable model—or rather, the immutable parameters—of the probe head is retrieved from the memory in which it is stored.

In-Situ-IV: Additional Calibration

The position and the orientation of the measuring probe are determined in a plurality of configurations, for example a set of pairs of angles $\alpha_B$ and $\alpha_A$ of the probe head. This second set of configurations can be much smaller than the set of the configurations examined in the factory calibration and, in fact, it may have 5 to 12 distinct orientation. The position and the orientation of the probe can be determined by measuring the surface of a calibration artifact whose shape is known, such as a sphere. In each orientation, the CMM may contact 5-25 positions on the sphere, in a typical case. Since the parameter space is reduced, this later calibration can have a duration limited to few minutes (e.g. 5-15 minutes), ideally.

In-Situ-V: Completing the Model

Assuming the validity of the immutable model, the modelling of the complete measurement chain needs additional parameters, the so-called "configuration-dependent parameters" that describe, among other things, how the probe head is fixed on the positioning platform of the CMM and how the coordinate probe is attached to the distal connector of the probe head, as well as model parameters specific to the probe. These parameters are determined by a fitting procedure using the measures obtained in the phase in-situ IV.

The additional parameters can be function of the type of the attached coordinate probe (e.g. touch coordinate probe, contactless coordinate probe) and/or of the version or model of the coordinate probe (e.g. function of a serial number or product number of the coordinate probe).

The fitting procedure for determining the configuration-dependent parameters as well as the fit procedure used for determining the immutable parameters, can advantageously rely on optimising parameters so as to simultaneously minimise model errors for a plurality of configurations where measurements have been realized during the additional calibration, during the first calibration respectively.

The fitting procedure can also use previous determined additional parameters and/or previous determined additional parameters ranges for defining parameters ranges (e.g. minimal and/or maximal acceptable values) for one or more of these additional model parameters. The ranges can be included in the fit procedure or can be used to accept or reject the determined parameters. Such parameters and ranges can be collected from a suitable memory and can be retrieved from this memory every time a fitting procedure needs to be executed, such as a non-volatile memory that resides in the probe head itself (symbolized by block 57 in FIG. 2), or on an external memory, for example a removable memory (a USB key) provided with the probe head, or they may be stored in a networked server, such as a cloud server, even another CMM being accessible through the internet. As the articulated probe head is primarily provided as part of a new CMM, these parameters and ranges can be stored in a memory of the CMM (e.g. in a memory of the CMM controller 38). The configuration-dependent parameters determined by the fitting procedure can be advantageously stored as previous determined additional parameters for a successive fitting procedure.

In Situ-VI: Measure of the Workpiece

The model is now complete and the server 38 can use it to map any possible combination of positional parameters of the machine (for example defined by X, Y, Z, $\alpha_B$, $\alpha_A$) to a position and orientation of the active end of the coordinate probe (for example the position of the centre of the touch sphere 62). Following the measurement plan defined previously, the desired coordinates of points on the surface of the workpiece are determined by known methods.

This manner of calibrating the machine is considerably more agile than calibrating the whole system on-site, because the individual geometry of the probe head (or another accessory) is contained in the immutable model that is assumed to be valid. The in-situ calibration needs only to determine the configuration-dependent parameters, that is, the mounting parameters of the various subsystems, and this can be done efficiently with a reduced number of measurements.

This manner of calibrating the machine is also considerably more effective (i.e. timesaving) from the user point of view, as, if the first calibration may involve more than 200 orientations of the articulated probe head (for example 200, 600 or 1'000 distinct orientations), the additional calibration may involve much less positions of the probe head (typically only six or twelve), i.e. at least ten time—generally at least fifty times-less configuration than the first calibration.

Moreover, if only the coordinate probe and/or a component thereof (e.g. probe extension, or probe's measuring module) is changed, as it often happens, the determination of the configuration-dependent model can be simplified while the head mounting parameters are not disturbed. In fact, in case of a simply change of a probe extension or measuring module (e.g. touch module), the determination of the configuration-dependent parameters is limited to the probe parameters, while, in case of a change of the coordinate probe, only the probe parameters and the probe mounting parameters (e.g. 3/6DoF) need to be determined anew.

Full error mapping (i.e. full individual calibration), in which the position and orientation of the probe active end are recorded for each possible configuration of the probe head is the "gold standard" of calibrations and is reputed to provide maximum accuracy. Yet, the inventors have found that the model-based calibration of the invention provide more than acceptable accuracy in most real cases, at a fraction of the time.

When ultimate accuracy is needed, it is often only in special positions of the workpieces which are measured with the probe in one or a few special orientations. In this case, the full calibration can be carried out for the special orientations only, and the model calibration can be corrected or overridden with the full calibration only when the probe head is in one of the special orientations.

This hybrid method can be summarised in the following steps:

Merge-I: Selective Accurate Calibration

An accurate calibration is carried out for one or more special orientations (combinations $\alpha_B$, $\alpha_A$) of the measuring probe, this step comprising an individual calibration of a given (third) set of configurations.

The accurate calibration provides an accuracy that is superior to that of the mathematical model. This calibration is based on an error mapping, i.e. determines empirically the error at each of the special orientations by means of individual (i.e. model-independent) calibrations. Each error of the error map is thus individually determined uniquely from measurement when the probe head is oriented according to the related configuration.

Preferably, the accurate calibration is executed in the same system used for the in-situ calibration disclosed above, on a known calibration artifact, e.g. the accurate calibration is part of the additional calibration. In such variant, the accurate calibration can be executed sequentially (i.e. before or after) the step of measuring the calibration artefact for determining the additional model parameters. Alternatively, the accurate calibration can be executed simultaneously (i.e., in a single operation), or concatenated, with the step of measuring the calibration artefact for determining the additional model parameters. In case of a sequential approach, the accurate calibration can rely on the same or on a different calibration artifact than the one used for determining the additional model parameters.

For timesaving purpose, the third set of configurations can be a subset of all configurations the probe head can assume. In particular, the third set of configurations can be chosen based on a model of the workpiece that preferably comprises tolerances and/or relationship (e.g. a Geometric Dimensioning and Tolerancing "GD&T" model), to include the orientations used for the most critical measurements. Alternatively or complementarily, orientations can be selected according to (e.g. function of) the mount of the articulated probe head on the coordinate-measuring system (e.g. orientation of the articulated probe head mount) and/or regularly spaced along the rotational axes.

Merge-II: Measure of the Workpiece

The workpiece 80 is placed on the table and measured. When the orientation of the coordinate probe is one of the special orientations where an individual calibration has been executed (e.g. one of said third set of configurations), the server 38 can have, not only the model of the assembly but also the individual calibration for determining the coordinates of points on the workpiece's surface. In such orientation, the server 38 can selectively use the mathematical model or the accurate calibration (i.e. the individual calibration), notably by overriding the mathematical model (i.e. using the individual calibration in place of the mathematical moel), or by correcting the mathematical model for this orientation. For all other configurations where an individual calibration have not been realized, the mathematical model is used as above.

This combined embodiment is advantageous in special applications where part of the surface of the workpiece requires high accuracy, but the accuracy required is not so stringent in other parts. The sensitive surfaces may be for example fastening holes whose axes must be determined very precisely. In this case, the sensitive surfaces can be measured accurately without changing the orientation of the probe, and this favourable orientation is identified and selected for an accurate calibration.

The invention also concerns the coordinate-measuring system 30, notably in form of a coordinate measuring machine that is configured to enable above-embodiments of the above-described method, as illustrated in FIG. 1.

Notably, the invention also concerns the coordinate-measuring system 30 including: the positioning platform 35, the articulated probe head 50 connected to the positioning platform, and the coordinate probe 61 removably connected to the articulated probe head, whereby the articulated probe head can assume a plurality of configurations corresponding to diverse orientations of the coordinate probe, and wherein the coordinate-measuring system can be configured to:

collect (notably retrieve) the first set of model parameters defining a model of the articulated probe head based on the first calibration wherein the probe head is caused to assume all the configurations in the first set of configurations; the model parameters can be recorded in a memory of the articulated probe head, of the coordinate-measuring system (e.g. the controller), or in an external memory being accessible by the coordinate-measuring machine (e.g. another coordinate-measuring machine, a networked server, a cloud server or cloud storage)

to measure an artifact whose geometry is known while the probe head is caused to assume all the configurations in the second set of configurations;

based on the measure of the artifact, to determine additional model parameters defining, with the first set of model parameters, the model of the assembly of the articulated probe head on the coordinate-measuring system with the coordinate probe; and to measure the workpiece 80 by selecting a desired configuration of the articulated probe head, bringing the coordinate probe in contact with or in proximity to the workpiece and determining coordinates of points on the workpiece's surface from a measure of the position of the positioning platform using the model of the assembly.

The coordinate-measuring system can be further configured to individual calibrating a third set of configurations of the articulated probe head, as above described. The determination of coordinates of point on the workpiece's surface can thus include, when the configuration of the articulated probe head is in the third set of configurations, a selected use between the model of the assembly and the individual calibration, e.g. by overriding or correcting the model of the assembly based on said individual calibrating.

Figure 3:
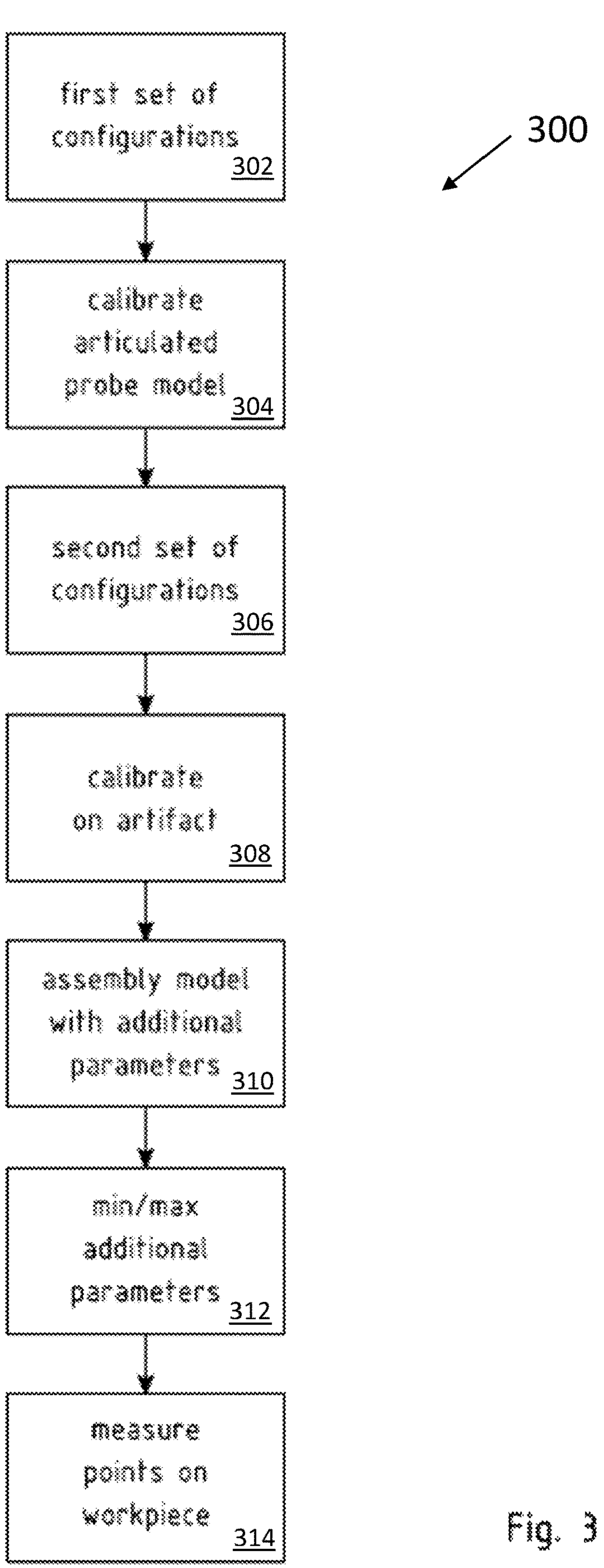
FIG. 3 is a flow chart of a method of calibration for a coordinate-measuring system.

FIG. 3 illustrates a flow chart of a method 300 of calibration for a coordinate-measuring system. The method 300 includes: first set of configurations is obtained (block 302); the articulated probe model is calibrated (block 304); second set of configurations is obtained (block 306); a calibration is performed on the artifact (block 308); an assembly model with additional parameters is obtained (block 310); a min/max value for one or more additional parameters is obtained (block 312); and points on the workpiece are measured (block 314).

REFERENCE SYMBOLS IN THE FIGURES

30 coordinate measuring machine, CMM
31 bridge
32 carriage
33 table
Z-ram, quill, positioning platform
38 server, controller
50 articulated probe head
51 support element
53 first rotor
55 second rotor
57 non-volatile memory
58 connector
61 touch probe
62 feeler
70 calibration sphere
80 workpiece
A rotation axis of the second rotor
B rotation axis of the first rotor
$P_A$ reference point of the second rotor
$P_B$ reference point of the first rotor
$P_R$ reference point of the support element
$P_T$ reference point of the end-probe, centre of the feeler
X linear coordinate
Y linear coordinate
Z linear coordinate
$r_{AT}$ vector
$r_{BA}$ vector
$r_{RB}$ vector
$\Sigma_A$ reference system fixed to the second rotor
$\Sigma_B$ reference system fixed to the first rotor
$\Sigma_R$ reference system fixed to the support element
$\alpha_A$ rotation angle of the second rotor
$\alpha_B$ rotation angle of the first rotor

The invention claimed is:

1. A method of calibration for a coordinate-measuring system, wherein the coordinate-measuring system includes an articulated probe head connected to a positioning platform of the coordinate-measuring system and a coordinate probe removably connected to the articulated probe head, whereby the articulated probe head can assume a plurality of configurations corresponding to diverse orientations of the coordinate probe, the method including:

a first calibration, in which a first set of model parameters defining a model of the articulated probe head is determined while the probe head is caused to assume the configurations in a first set of configurations, a second calibration comprising measuring an artifact whose geometry is known with the coordinate-measuring system and the coordinate probe mounted on the articulated probe head while the probe head is caused to assume all the configurations in a second set of configurations, based on the measurement of the artifact, determination of additional model parameters defining, with the first set of model parameters, a model of an assembly of the articulated probe head with the coordinate probe, defining a range or a minimum value or a maximum value for one or more of said additional model parameters, and measuring coordinates of points on a surface of a workpiece using the model of the assembly of the articulated probe head with the coordinate probe.

2. The method of claim 1, wherein the first set of configurations comprises more configurations than the second set of configurations.

3. The method of claim 1, comprising storing at least part of the first set of model parameters in a non-volatile memory comprised in the articulated probe head.

4. The method of claim 1, wherein the first calibration comprises mounting the articulated probe head on a position platform of a calibration coordinate measuring system, connecting a calibration coordinate probe to the articulated probe head and measuring a calibration artifact with the coordinate measuring system, the coordinate probe and the articulated probe head.

5. The method of claim 1, wherein the first calibration comprises mounting the articulated probe head in a measuring volume of a measuring apparatus and acquiring position and/or orientation data of the articulated probe head with the measuring apparatus.

6. The method of claim 1, including mounting the articulated probe head on a positioning platform of a coordinate measuring system and connecting a coordinate probe to the articulated probe head prior to the second calibration.

7. The method of claim 1, wherein the articulated probe head has one, two, three or more than three rotation axes.

8. The method of claim 1, wherein the first calibration and the second calibration are performed at a different locations, or the first calibration is performed at a fabrication site of the articulated probe head or at an installation or assembly site of the coordinate-measuring system.

9. The method of claim 1, comprising a change of coordinate probe between the first calibration and the second calibration.

10. The method of claim 1, wherein the first set of configurations comprises more than 200 configurations of the articulated probe head and the second set of configurations comprises less than 24 configurations of the articulated probe head; and/or the first set of configurations comprises at least ten times more configurations than the second set of configurations.

11. The method of claim 1, comprising a selective accurate calibration of a third set of configurations, wherein the measuring of coordinates of points on the workpiece's surface includes overriding or correcting the model of the assembly when the configuration of the articulated probe head is in the third set of configurations.

12. The method of claim 11, comprising defining the third set of configurations based on a model of the workpiece.

13. The method of claim 11, comprising recording a table of correspondence between a position of the positioning platform and a position of a reference point of the coordinate probe for said third set of configurations.

14. A coordinate-measuring system including: a positioning platform, an articulated probe head connected to said positioning platform, and a coordinate probe removably connected to the articulated probe head, whereby the articulated probe head can assume a plurality of configurations corresponding to diverse orientations of the coordinate probe, the coordinate-measuring system being configured to:

retrieve a first set of model parameters defining a model of the articulated probe head based on a first calibration wherein the probe head is caused to assume all the configurations in a first set of configurations, measure an artifact whose geometry is known while the probe head is caused to assume all the configurations in a second set of configurations, based on the measure of the artifact, determine additional model parameters defining, with the first set of model parameters, a model of an assembly of the articulated probe head on the coordinate-measuring system with the coordinate probe defining a range or a minimum value or a maximum value for one or more of said additional model parameters, and measure a workpiece by selecting a desired configuration of the articulated probe head, bringing the coordinate probe in contact with or in proximity to the workpiece and determining coordinates of points on the workpiece's surface from a measure of a position of the positioning platform using the model of the assembly.

15. The coordinate-measuring system of claim 14, comprising a non-volatile memory storing at least part of the first set of model parameters.

16. The coordinate-measuring system of claim 14, further configured to individual override or correct the model of the assembly when the configuration of the articulated probe head is in a third set of configurations.

17. A method of calibration for a coordinate-measuring system, wherein the coordinate-measuring system includes an articulated probe head connected to a positioning platform of the coordinate-measuring system and a coordinate probe removably connected to the articulated probe head, whereby the articulated probe head can assume a plurality of configurations corresponding to diverse orientations of the coordinate probe, the method including:

a first calibration, in which a first set of model parameters defining a model of the articulated probe head is determined while the probe head is caused to assume the configurations in a first set of configurations, a second calibration comprising measuring an artifact whose geometry is known with the coordinate-measuring system and the coordinate probe mounted on the articulated probe head while the probe head is caused to assume all the configurations in a second set of configurations, based on the measurement of the artifact, determination of additional model parameters defining, with the first set of model parameters, a model of an assembly of the articulated probe head with the coordinate probe, defining a third set of configurations based on a model of a workpiece, a selective accurate calibration of the third set of configurations, correcting or overriding the model of the assembly when the configuration of the articulated probe head is in the third set of configurations, and measuring coordinates of points on a surface of the workpiece using the model of the assembly of the articulated probe head with the coordinate probe.

* * * * *